(No Model.) 2 Sheets—Sheet 1.
S. L. PLATT.
TROLLEY CARRIAGE FOR CONDUITS.
No. 481,817. Patented Aug. 30, 1892.
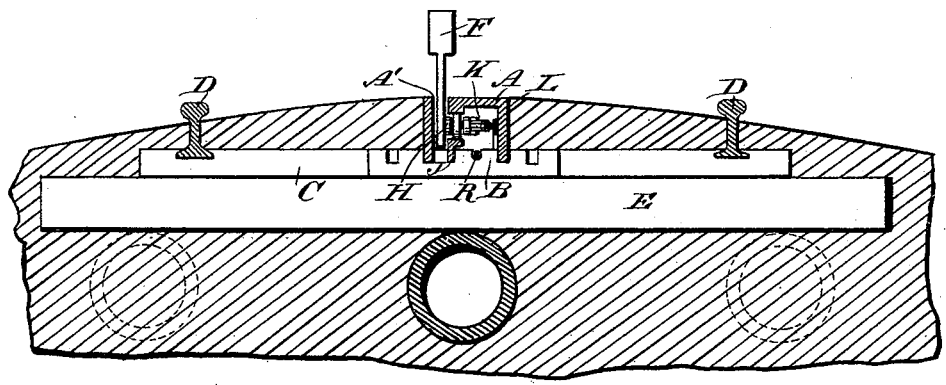
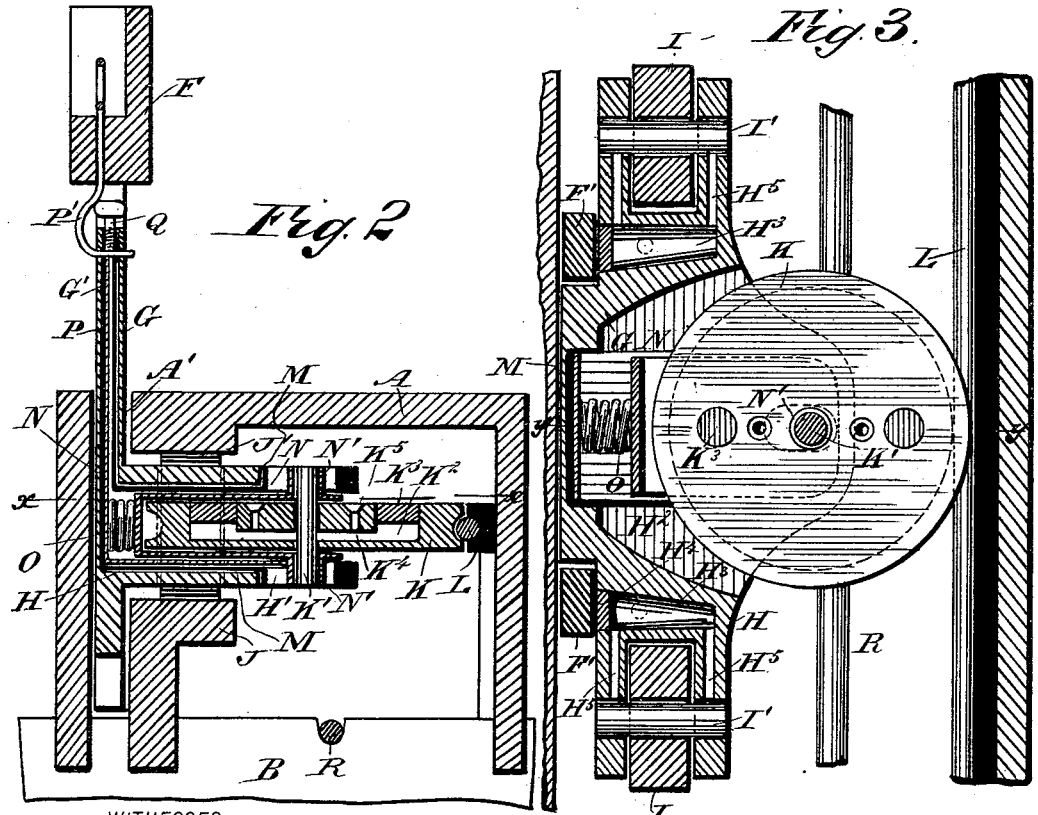
WITNESSES:
F. McArdle.
C. Sedgwick
INVENTOR:
S. L. Platt
BY Munn & Co.
ATTORNEYS (No Model.) 2 Sheets—Sheet 2.
S. L. PLATT.
TROLLEY CARRIAGE FOR CONDUITS.
No. 481,817. Patented Aug. 30, 1892.
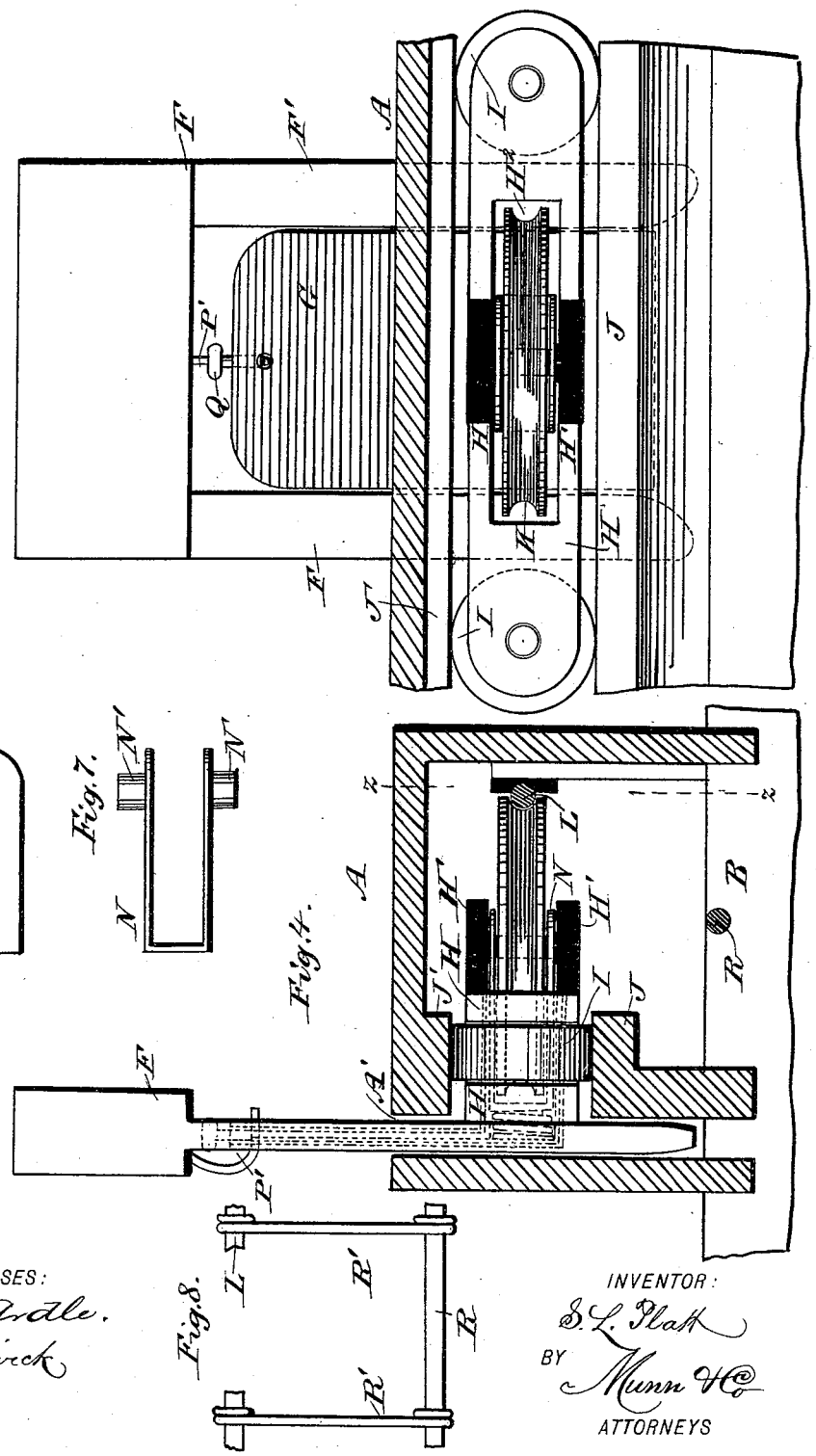
WITNESSES:
F. McArdle.
C. Sedgwick
INVENTOR:
S. L. Platt
BY Munn & Co.
ATTORNEYS

UNITED STATES PATENT OFFICE.

STEPHEN L. PLATT, OF ELGIN, ILLINOIS.

TROLLEY-CARRIAGE FOR CONDUITS.

SPECIFICATION forming part of Letters Patent No. 481,817, dated August 30, 1892.

Application filed June 18, 1891. Serial No. 396,724. (No model.)

*To all whom it may concern:*

Be it known that I, STEPHEN L. PLATT, of Elgin, in the county of Kane and State of Illinois, have invented a new and Improved Electric Conductor, of which the following is a full, clear, and exact description.

The object of the invention is to provide a new and improved conductor which is simple and durable in construction, very effective in operation, not liable to get out of order, and more especially designed for carrying an electrical current generated by a stationary dynamo to a traveling motor.

The invention consists of a wheeled carriage adapted to be engaged by the car-hanger and a contact-wheel journaled in spring-pressed bearings held in the said carriage.

The invention further consists of a conduit or duct formed with a slot and supporting the conducting-wire and rails arranged in the said duct and on which travels a carriage having a wheel in contact with the wire.

The invention also consists of certain parts and details and combinations of the same, as will be hereinafter fully described, and then pointed out in the claims.

Reference is to be had to the accompanying drawings, forming a part of this specification, in which similar letters of reference indicate corresponding parts in all the figures.

Figure 1 is a transverse section of the improvement as applied. Fig. 2 is an enlarged transverse section of the improvement on the line $y$ $y$ in Fig. 3. Fig. 3 is a sectional plan view of the same on the line $x$ $x$ in Fig. 2. Fig. 4 is an end elevation of the same with the conduit in section. Fig. 5 is a longitudinal section of the same on the line $z$ $z$ in Fig. 4. Fig. 6 is a plan view of the contact-wheel bearing. Fig. 7 is a side elevation of the same, and Fig. 8 is an enlarged side elevation of the construction between the conducting and feed wires.

The improved electric conductor is provided with a conduit or duct A, formed in the shape of a box open at the bottom, the sides of the said box resting on cross-pieces B, arranged in line with the ties C, carrying the rails D, on which travels the motor or car. The ties C, as well as the cross-pieces B, are supported on a suitable foundation E, as illustrated in Fig. 1.

In the top of the conduit A and near one side of the same is formed a slot A', extending longitudinally and into which is adapted to pass the hanger F, extending downward from the car or motor traveling on the track-rails D. The hanger F is provided with two downwardly-extending prongs or forks F', straddling an arm G, extending from the inside of the conduit A through the slot A', as is plainly illustrated in the drawings. The arm G is formed with a vertical recess G' and is rigidly connected at its lower end with a carriage H, provided at its forked ends with wheels I, traveling between two longitudinal rails J and J', of which the former is arranged in the bottom of the conduit A and is supported from the cross-pieces B, as is plainly shown in the drawings. The top rail J' is formed or secured on the under side of the top of the conduit A and is located directly above the rail J, so that each wheel I touches at its bottom the rail J and on its top the under side of the rail J'.

The carriage H carries a contact-wheel K, arranged horizontally and formed in its periphery with a groove engaging the conducting-wire L, supported in suitable holders on one of the sides of the conduit A, as is plainly shown in the drawings.

The contact-wheel K is provided with a shaft K', journaled in bearings N', formed on the ends of a U-shaped frame N, extending in a recess H², formed in the carriage H, and opening into the vertical recess G' of the arm G. The recesses H² and G' are lined with a non-conducting material M. The middle part of the frame N is pressed on at its outside by one end of a coiled spring O, the other end of which rests on the contact wire or plate P, extending upward through the arm G to connect with the wire P', leading to the motor. The bearings N' of the frame N extend in transversely-arranged slots H', formed on the carriage H, so that the spring can exert its pressure on the frame N to force the wheel K in frictional contact with the conducting-wire L. An uninterrupted contact is thus at all times established between the wire L and the wheel K. The wheel-frame N by the spring O is in contact with the insulated wire P, connecting by the wire P' with the motor, so that an unbroken circuit is formed from the wire L to the electric motor located in the car.

A feed-wire R is arranged in the bottom of the conduit A and is supported in notches in the cross-pieces B, as illustrated in the drawings, and is connected with the conducting-wire L by wires R', as shown in Fig. 8, so that the conducting-wire can be cut for crossing or other purposes. The wheel K is provided with one or more oil-receptacles $K^2$, adapted to be closed on top by a stopper $K^3$, as plainly shown in Figs. 2 and 3. From each of the oil-receptacles $K^2$ passes a channel $K^4$ to the shaft or spindle K', so that the latter is well supplied with oil from the receptacle $K^2$. Into each channel $K^4$ leads an opening $K^5$, extending to the top of the wheel, so that the receptacle $K^2$ can be refilled whenever necessary. A similar oil-receptacle $H^3$ is arranged in each end of the carriage H, the said receptacle being closed by a stopper $H^4$ and connected by channels $H^5$ with the shafts or trunnions I' of the wheels I. (See Fig. 3.)

Having thus fully described my invention, I claim as new and desire to secure by Letters Patent—

1. In an electric conductor, the combination, with a carriage mounted on wheels and provided with an upwardly-projecting hollow arm, of a contact wire or plate extending upward through the arm, a U-shaped frame fitted to slide in the carriage, a contact-wheel mounted in the frame, and a spring arranged between the said frame and the contact wire or plate, substantially as described.

2. In an electric conductor, the combination, with a carriage mounted on wheels and provided with a horizontal recess, transverse slots, and a vertical and recessed arm, of a contact-plate extending up through the recess of the said arm, a U-shaped frame mounted in the horizontal recess of the carriage, a contact-wheel mounted in the frame and having its bearings projecting into transverse slots of the carriage, and a spring arranged between the frame and contact wire or plate, substantially as herein shown and described.

3. In an electric conductor, the combination, with a slotted conduit having upper and lower tracks and a conducting-wire secured to one side of the conduit, of a forked hanger, a carriage mounted on wheels traveling on said tracks and provided with a recessed arm projecting up between the forks of the hanger, a contact plate or wire extending up through the arm, a U-shaped frame mounted to slide in the carriage, a contact-wheel mounted in the frame, and a spring arranged between the frame and the contact wire or plate, substantially as herein shown described.

STEPHEN L. PLATT.

Witnesses:
C. H. WAYNE,
C. E. BOTSFORD.